(12) United States Patent
Brantschen et al.

(10) Patent No.: US 10,369,681 B2
(45) Date of Patent: Aug. 6, 2019

(54) CUTTING DISK

(71) Applicant: Robert Bosch GmbH, Stuttgart (DE)

(72) Inventors: Damian Brantschen, St. Niklaus (CH);
Ivo Gruber, St. Niklaus (CH);
Reinhard Truffer, Randa (CH)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 15/167,407

(22) Filed: May 27, 2016

(65) Prior Publication Data
US 2016/0346903 A1 Dec. 1, 2016

(30) Foreign Application Priority Data

May 29, 2015 (DE) ........................ 10 2015 209 914

(51) Int. Cl.
*B24D 5/12* (2006.01)
*B23D 61/02* (2006.01)

(52) U.S. Cl.
CPC ............... *B24D 5/12* (2013.01); *B23D 61/02* (2013.01)

(58) Field of Classification Search
CPC .................................. B24D 5/12; B23D 61/02
USPC ........ 451/541, 542, 548, 461; 125/15, 13.01
See application file for complete search history.

(56) References Cited

U.S. PATENT DOCUMENTS

| 2,062,969 | A | | 12/1936 | Dutcher | |
|---|---|---|---|---|---|
| 2,659,397 | A | | 11/1953 | Drake | |
| 3,347,289 | A | * | 10/1967 | Zizka | B23D 45/105 144/162.1 |
| 3,576,200 | A | * | 4/1971 | Elmes | B23D 61/021 407/118 |
| 4,133,240 | A | | 1/1979 | Vollmer et al. | |
| 4,262,650 | A | | 4/1981 | Ferrand et al. | |
| 4,368,610 | A | * | 1/1983 | Aono | A01D 34/73 30/347 |
| 4,432,264 | A | | 2/1984 | Scott | |
| 4,766,794 | A | * | 8/1988 | Blake | B23D 61/021 83/847 |
| 7,117,863 | B1 | * | 10/2006 | Dassoulas | A01K 5/0114 125/13.01 |
| 7,882,774 | B1 | * | 2/2011 | Bernardy | B23D 61/021 30/276 |

FOREIGN PATENT DOCUMENTS

| DE | 37 40 200 A1 | 6/1989 |
|---|---|---|
| DE | 196 16 764 A1 | 11/1997 |
| DE | 299 11 665 U1 | 10/1999 |
| DE | 103 37 841 A1 | 3/2005 |
| DE | 10 2010 042 016 A1 | 4/2012 |

(Continued)

*Primary Examiner* — Robert A Rose
(74) *Attorney, Agent, or Firm* — Maginot, Moore & Beck LLP (57) ABSTRACT

A cutting disk for a machine tool for the cutting and/or grinding of workpieces, in particular consisting of materials such as cellulose or wood, includes a disk-shaped main body that has a radially inside receiving region and a radially outside work zone. The radially outside work zone includes at least one first active region and at least one second active region. The first active region and the second active region each have at least one cutting element that is configured as a cutting grain or as a cutting tooth. The second active region rises radially or protrudes radially in relation to the first active region.

18 Claims, 4 Drawing Sheets

(56) References Cited

FOREIGN PATENT DOCUMENTS

| | | |
|---|---|---|
| EP | 1 716 956 A1 | 11/2006 |
| GB | 1 166 369 | 10/1969 |
| JP | 2003-275969 A | 9/2003 |
| JP | 2008-238299 A | 10/2008 |

* cited by examiner

CUTTING DISK

This application claims priority under 35 U.S.C. § 119 to patent application no. DE 10 2015 209 914.8, filed on May 29, 2015 in Germany, the disclosure of which is incorporated herein by reference in its entirety.

BACKGROUND

A cutting disk for a machine tool for the cutting and/or grinding of workpieces, in particular consisting of materials such as cellulose or wood, comprises a disk-shaped main body having a radially inside receiving region and a radially outside work zone with at least one first active region and at least one second active region. The first and the second active region respectively have at least one cutting element, configured, in particular, as a cutting grain or as a cutting tooth.

In DE 103 37 841 A1, a cutting disk is disclosed. The cutting disk comprises a radially inwardly arranged receiving region for the releasable fixing of the disk to a rotary drive and a radially outwardly arranged active region for cooperation with a workpiece. The active region has outwardly open, oblique slits and is provided with a cutting coating containing an abrasive cutting body.

SUMMARY

The object of the disclosure is to improve, with simple design measures, a cutting disk for a machine tool, in particular a portable power tool.

The object is achieved with a cutting disk for a machine tool for the cutting and/or grinding of workpieces, in particular consisting of materials such as cellulose or wood, comprising a disk-shaped main body having a radially inside receiving region and a radially outside work zone. The work zone has at least one first active region and at least one second active region. The first and the second active region respectively have at least one cutting element, configured, in particular, as a cutting grain or as a cutting tooth. According to the disclosure, the at least one second active region rises radially or protrudes radially in relation to the at least one first active region.

Usually, in commercially available cutting disks, a large part of the cutting elements breaks away or splinters off in the event of a collision or an impacting of the cutting disk onto an unexpectedly hard material, such as, for instance, stone or metal, so that the cutting disk becomes blunt or suffers a loss of performance. The disclosure makes it possible to limit a breakaway of the cutting elements in the event of a collision. In a collision, cutting elements provided on or in the second active region, which rises radially or protrudes radially in relation to the first active region, are here purposefully sacrificed in order to protect the cutting elements arranged radially behind the second active region. A significantly longer service life of the cutting disk is thereby enabled.

By "radially rise" should in this context be understood that in particular the second active region, in relation to the first active region, rises radially from an axis or a centre point of the cutting disk in the direction of the work zone such that the second active region preferably delimits at least partially the maximum extent of the cutting disk.

By "radially protruding" should in this context be understood that in particular the second active region, in relation to the first active region, protrudes radially from an axis or a centre point of the cutting disk in the direction of the work zone such that the second active region preferably delimits at least partially the maximum extent of the cutting disk.

By "disk-shaped" should be understood an, in particular at least substantially, cylindrical shape, the diameter or radius of which is many times higher than its thickness or its extent running orthogonally to the radius.

The main body can have an axial extent of up to 5 mm, in particular up to 3.5 mm, preferably up to 3 mm, preferably up to 2 mm, particularly preferably up to 1.6 mm, such as, for instance 1.5 mm or less. An axial extent of the main body of up to 1 mm, in particular up to 0.75 mm, preferably up to 0.6 mm, such as, for instance, 0.5 or less, would also be conceivable.

By a "cutting element" should in this context be understood an element which has a deforming and/or eroding effect on the workpiece to be machined. A cutting element can be formed by a cutting grain or a cutting tooth, which consists, in particular, of a mineral and/or of a ceramic material, such as, for instance, of diamond, of corundum, of silicon carbide, of boron nitride, etc. The cutting grain can in this case be formed of a hard metal or another material which appears sensible to a person skilled in the art. The cutting grain or the cutting tooth can in this case have any geometric design which appears sensible to a person skilled in the art. Similarly, a cutting element can be at least partially configured as an edge, a corner or a taper of a surface structure, which on the workpiece to be machined causes an increased friction and temperature build-up which engenders a deforming and/or eroding effect on or in the workpiece to be machined.

The cutting element can be designed as a grinding element.

The cutting grain can be designed as a broken or as a shaped cutting grain.

By an "active region" should be understood a region which has at least one cutting element configured for the machining of workpieces. The active region can here be designed as at least one active side, at least one active face, and/or at least one active edge. In particular, the second active region can be configured at least partially as a radially rising or radially protruding elevation in relation to the first active region.

By a region can be understood at least one face, which is delimited, in particular, by edges.

In particular, the cutting element can be embedded in the first and/or in the second active region. By "embedded" should in this context be understood an at least partial encasement of the cutter, wherein a form closure and/or a material closure are formed between the main body and at least a part of the cutter. In the manufacturing process, the cutter can advantageously be embedded directly in the main body, in that a bonding agent is configured, for instance, around the at least one cutting element.

Preferably, the at least one cutting element of an active region can be provided on the end face of the main body. In addition, the cutting element, in particular adjacent to an end face, can be provided on at least one side face.

The subclaims define expedient refinements of the cutting disk according to the disclosure.

It can be expedient that the first active region has at least one first active face and/or at least one first active edge, and the second active region has at least one second active face and/or at least one second active edge for the machining of a workpiece. It is thereby advantageously possible to work, in particular cut and/or grind, both with the first active face and/or the first active edge and with the second active face and/or the second active edge. The first active face and/or the first active edge, and the second active face and/or the second active edge, can alternate in the peripheral direction, so that a wave profile is obtained.

The second active edge can be designed as a radially outer, in particular outside, active edge. The first active face can be designed as a radially inner, in particular inside, active edge.

By an "active face" should in this context be understood a face which is provided to cut a workpiece and has cutting elements configured, in particular, as cutting grains. The active face can here be of curved, in particular convex, design. The active face can further be of plane design. Preferably, a plurality of active faces, which are angled relative to each other, can be provided. Particularly preferably, at least two, in particular in parallel, mutually opposing lateral active faces, which are connected by means of an, in particular at least substantially, axially extending active face, can be provided. The active face can here introduce a geometrically undefined cutting action into a workpiece. The active face can here be provided to delimit an, in particular maximum, radial extent of the main body or of the cutting disk. The active face can be provided on the end face of the cutting disk or of the main body.

By an "active edge" should in this context be understood an edge which is provided to cut a workpiece and/or to guide the cutting disk in a workpiece. In the case of an active edge for the cutting of a workpiece, the active edge can extend in the axial direction and be designed, in particular, as a geometrically defined cutting edge. In the case of an active edge for the guidance of the cutting disk, the active edge can delimit an active face. The active edge here extends in the peripheral direction and can be designed, in particular, as a geometrically undefined edge. The active edge can be provided to separate two faces, such as, for instance, a side face and an end face adjoining the side face.

The active edge can here delimit an, in particular maximum, radial and/or axial extent of the main body or of the cutting disk.

In particular, at least a first active face and/or a second active face and/or a transition face extends on, in particular in one piece with, an end face of the main body or of the cutting disk.

In addition, it can be expedient that the first active region, in particular the at least one first active face and/or the at least one first active edge, is arranged offset in the peripheral direction in relation to the second active region, in particular the at least one second active face and/or at least one second active edge. In particular, the first active region, in particular the at least one first active face and/or the at least one first active edge, can border in the peripheral direction on the second active region, in particular the at least one second active face and/or at least one second active edge.

In addition, it can be expedient that the second active region, in particular at least partially, forms a maximum radial extent of the cutting disk. It can thereby advantageously be achieved that preferably the second active region collides with a hard material, and thus protects the first active region at least partially from damage.

Furthermore, it can be expedient that the first active face and/or the first active edge form(s) a first envelope, and the second active face and/or the second active edge form(s) a second envelope, so that the second envelope fully surrounds the first envelope and runs, in particular, parallel to the first envelope. In particular, the first envelope and the second envelope can be mutually concentric.

By an "envelope" should be understood a surface of revolution which is formed by a rotation at least of one, in particular of the first or the second, active edge and/or active face about an axis of the cutting disk.

It can further be expedient that the second active region, in particular the at least one second active face and/or at least one second active edge, in the peripheral direction, continuously rises radially in relation to the first active region, in particular the at least one first active face and/or the at least one first active edge.

Preferably, a plurality of regularly spaced, in particular first active regions and/or second active regions can be provided.

Particularly preferably, the second active region can extend in the peripheral direction in relation to the first active region by up to 50%, in particular up to 40%, preferably up to 30%, preferably up to 20%, particularly preferably up to 10%, such as, for instance 5%, 3% or less than 1%. Preferably, a peripheral portion can be configured such that, in the peripheral direction, a first active region can be followed by two second active regions. Particularly preferably, the peripheral portion can be configured such that, in the peripheral direction, a first active region is followed by a second active region, so that the peripheral portion runs in particular wavily in the peripheral direction. Preferably, a plurality of similar or different successive peripheral portions can be provided. A multiplicity of alternative arrangements of the first active region and of the second active region along a peripheral portion would also be possible however.

In particular more than four, such as, for instance, five, six, seven, eight, nine, ten, or eleven, wave portions can be provided. Particularly preferably, however, twelve, thirteen, fourteen, fifteen or more wave portions are provided.

As a result, the first active region and the second active region can during operation advantageously alternate in the peripheral direction or in the rotational direction, so that a very good result is achieved.

In addition, the first active region and the second active region can be designed alternatingly. In particular, the active region can be configured wavily in the peripheral direction.

It can further be expedient that the cutting disk has in a radially outside work zone at least one transition region for connecting the first active region to the second active region. The transition region can here preferably connect the first active region to the second active region. It can thereby be achieved that the transition region prevents too hard an impaction of a rotating cutting disk on a hard material or stock in the rotational direction.

The transition region can have a transition edge. The transition edge can be angled in relation to the first active edge and/or the second active edge, in particular radially.

In particular, the transition region, in particular at least one transition face and/or at least one transition edge, can rise radially from the first active region to the second active region, in particular at an angle ranging from 30° to 60°, preferably from 35° to 55°, preferably from 40° to 50°, particularly preferably from 43° to 48°, such as, for instance, 45°.

The transition region can have at least one cutting element, configured, in particular, as a cutting grain or as a cutting tooth.

The transition region can further serve as a baffle or as a deflector, wherein, for instance, the energy is transmitted in the rotational direction at least partially in a radial direction, so that the user, upon contact of the transition region with a hard workpiece, receives a feedback indicating that it has come into contact with a hard workpiece.

In particular, the first transition region can rise from the first active region to the second active region, in particular steadily, abruptly and/or monotonously.

Furthermore, it can be expedient that at least two second active regions lie opposite one another, in particular in the peripheral direction. In particular the at least two second active regions can be mutually separated by means of a recess. As a result, vibrations which are generated during cutting or grinding can be minimized by the recesses. Preferably, the recess can extend in the outside region in the radial direction.

Particularly preferably, the cutting element, configured in particular as a cutting tooth and/or as a cutting grain, can be soldered and/or welded to the main body. The cutting tooth and/or the cutting grain can hereby be connected advantageously to the main body. In principle, other connections which appear sensible to a person skilled in the art are also possible however.

In addition, it can be expedient that the cutting element of the first active region is configured as a first cutting tooth and the cutting element of the second active region is configured as a second cutting tooth. Preferably, the second cutting tooth protrudes radially in relation to the first cutting tooth. It can thereby be achieved that the second cutting tooth, when impacting on a hard material or a hard stock, is sacrificed or is purposefully excessively loaded in order to protect a first tooth.

In particular, the second active edge or the second cutting edge of the second cutting tooth can protrude radially in relation to the first active edge or the first cutting edge of the first cutting tooth, in particular at least partially, by up to 3 mm, in particular by up to 2 mm, preferably by up to 1.5 mm, particularly preferably by up to 1.25 mm, such as, for instance, 1.0 mm, 0.75 mm, or 0.5 mm. It would also be conceivable that the second active edge or the second cutting edge of the second cutting tooth protrudes radially in relation to the first active edge or the first cutting edge of the first cutting tooth by up to 8 mm, in particular up to 7 mm, preferably up to 6 mm, preferably up to 5 mm, particularly preferably up to 4 mm.

Preferably, the second active region can have a maximum second radius and the first active region can have a maximum first radius, wherein the second radius rises radially or protrudes radially in relation to the first radius by up to 4%, in particular by up to 2%, preferably by up to 1%, preferably by up to 0.75%, particularly preferably by up to 0.5%, such as, for instance, 0.4%, 0.3% or 0.2%. A second radius which rises radially or protrudes radially in relation to the first radius by up to 6% or by up to 5% would also be conceivable.

BRIEF DESCRIPTION OF THE DRAWINGS

Further details emerge from the following drawings description. In the drawing, illustrative embodiments of the disclosure are represented. The drawings, the description and the claims contain numerous features in combination. The person skilled in the art will expediently also view the features individually and put them together into sensible further combinations. Herein:

DETAILED DESCRIPTION

In the following figures, same components are provided with the same reference symbols.

The figures respectively relate to a cutting disk for the cutting and/or grinding of workpieces. The cutting disk according to the disclosure is universally usable and is suitable, in particular, for the machining of workpieces consisting of cellulose, such as, for instance grass, brush or roots, wood, plastic, or a composite. Alternatively, the cutting disk can also however be suitable for the machining of, for instance, metal, stone, or a composite.

The cutting disk is provided for the releasable reception on rotationally driven, commercially available machine tools. The cutting disk can be received in a receiving device of a machine tool, preferably of a portable power tool, which receiving device is already known to a person skilled in the art and is configured to receive the cutting disk, with a rotatory and/or translatory motion onto a workpiece to be machined. In particular a translatory feed is here introduced into the tool, in that the operator of the machine tool applies a force to the machine tool, in particular a machine tool housing.

In this context, both a stationary machine tool, such as, for example, a circular saw bench in accordance with Applications DE 102010042016 or U.S. Pat. No. 2,062,969 A, and a non-stationary machine tool, such as, for instance, a portable circular saw in accordance with Application DE 3740200 A1 or such as, for instance, a back-borne brush-cutter in accordance with Application DE 19616764 A1, is suitable as the machine tool. Alternatively, a hand-guided portable circular saw or angle grinder is also suitable.

Figure 1:
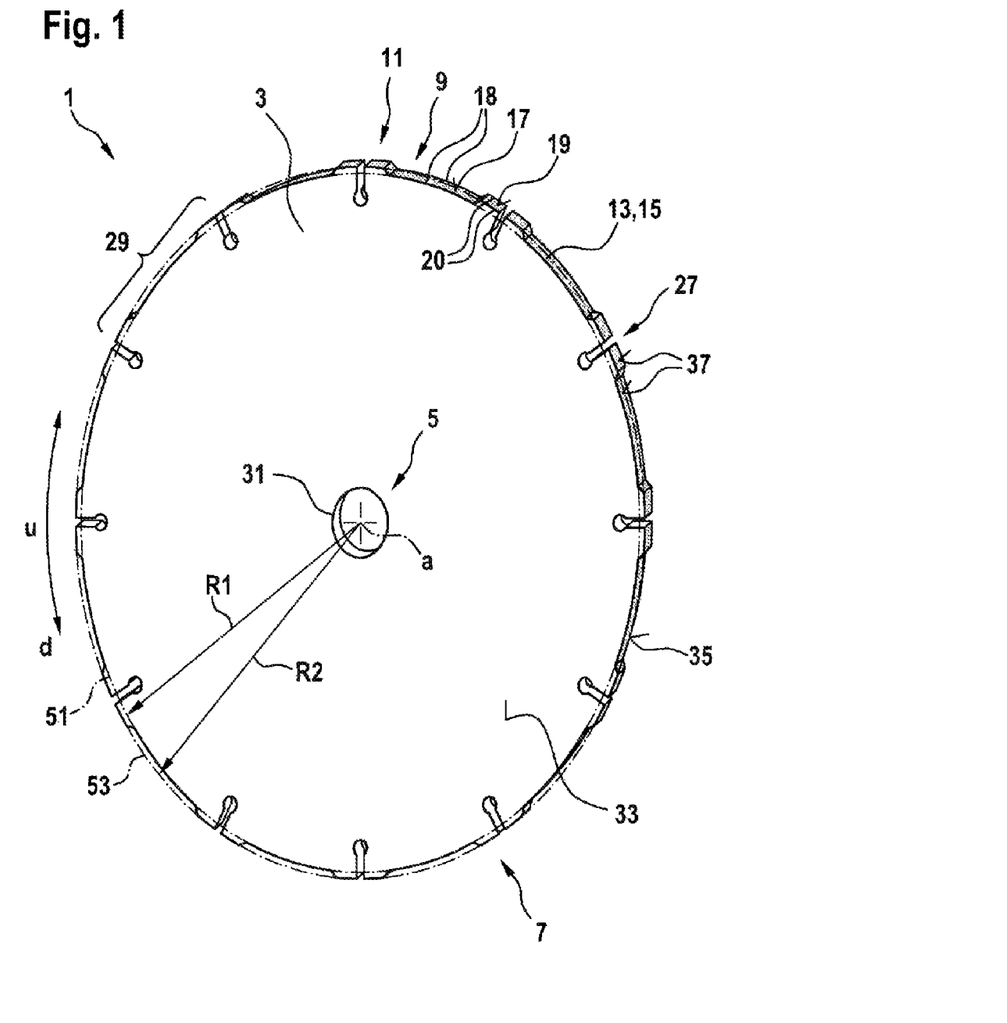
FIG. 1 shows a perspective view of a first embodiment of a cutting disk according to the disclosure.

FIG. 1 shows a cutting disk 1 comprising a disk-shaped main body 3 having a radially inside receiving region 5 and a radially outside work zone 7. The main body 3 has an axis a. The main body 3 here extends radially to the axis a in multiple measure in relation to an axial extent and forms a first side face 33 and a second side face 35 lying opposite the first side face 33, in particular parallelly to the first side face 33. The two side faces 33, 35 have an annular design. Alternatively, the two side faces 33, 35 have an oval-like design. The two side faces 33, 35 are of plane configuration. The two side faces 33, 35 have a distance apart of up to 1.75 mm, such as, for instance, around 1.5 mm.

Expediently, the main body 3 has a receiving opening 31, which extends circularly or coaxially about the axis a or about a centre point of the cutting disk 1 and delimits the radial extent of the receiving opening 31.

The receiving opening 31 is surrounded by the receiving region 5. Alternatively, the receiving region 5 can have further receiving openings 31, which are disposed, for instance, adjacent to the receiving opening 31. Adjacent to the receiving region 5, there follows in the radial direction a centre region (not represented further), which can have, for instance, damping openings already known from the prior art. Following on therefrom in the radial direction is a work zone 7, which surrounds both the centre region and the receiving region 5.

The work zone 7 is arranged radially on the outside and delimits the radial extent of the cutting disk 1. The work zone 7 has a plurality of first active regions 9 and a plurality of second active regions 11. The first active region 9 and the second active region 11 have a plurality of cutting elements 13, configured as cutting grains 13, which are provided at least on an end face 37 connecting the first side face 33 and the second side face 35. Alternatively or additionally, a plurality of cutting elements 13 configured as cutting bodies 13 are provided on the first side face 33 and the second side face 35 of the work zone 7. Thus the cutting grains 13 can protrude in the radial and/or in the axial direction from the main body 3.

The first active region 9 is arranged offset in the peripheral direction u in relation to the second active region 11.

In particular, the cutting elements 13 are welded to the main body 3.

The first active region 9 has a first active face 17. The second active region 11 has a second active face 19. The active faces 17, 19 are here designed as end faces 37 of the cutting disk 1. The active faces 17, 19 are curved and extend in the peripheral direction u along a circular sector about the axis a. The first active face 17 is distanced from the axis a with a first radius R1. The second active face 19 is distanced from the axis a with a second radius R2.

The first active face 17 has at least two, in particular mutually opposing, first active edges 18. The second active face 19 has at least two, in particular mutually opposing, second active edges 20. The active edges 18, 20 are likewise of curved design. Preferably, the active edges 18, 20 also have cutting elements 13 configured as cutting grains 13.

Figure 2:
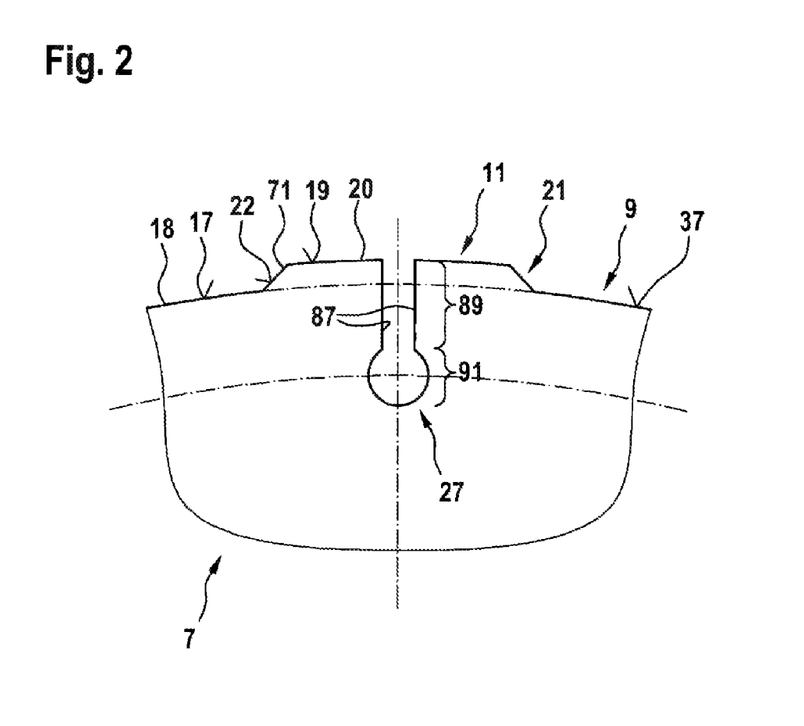
FIG. 2 shows an enlarged detail of the cutting disk from FIG. 1.

According to the disclosure, the second active region 11 is designed such that it protrudes radially in relation to the first active region 9, as can be seen, for instance, in the enlarged representation in FIG. 2. Alternatively or additionally, the second active region 11 can be designed such that it protrudes axially in relation to the first active region 9, for instance by virtue of an axial elevation (not represented further) of the second active region 11. In particular, the second active face 19 is designed such that it protrudes radially in relation to the first active face 17. Preferably, the second radius R2 of the second active face 19 is larger than the first radius R1 of the first active face 17. Preferably, a minimum radius of the second active face 19 is larger than the maximum radius of the first active face. In particular, the first active face 17 can form a first envelope 51, and the second active face 19 a second envelope 53, so that the second envelope 53 fully surrounds the first envelope 51 and preferably runs parallel thereto. The first envelope 51 and the second envelope 53 are arranged concentrically to each other.

The second active region 11 extends in the peripheral direction in relation to the first active region 9 by up to 25%. In particular, the second active face 19 protrudes in relation to the first active face 17 by up to 1.5 mm. Preferably, the radius R2, in relation to the radius R1, is larger by up to 0.75%, in particular by up to 0.5%.

In particular, at least one first active face 17 can run parallel in relation to at least one second active face 19. Alternatively or additionally, the second active face 19, in particular in the rotational direction d, can be angled, in particular ascendingly, in relation to the first active face 17.

There is further provided a transition region 21, which connects the first active region 9 to the second active region 11. The transition region 21 has a transition face 22, which connects a first active face 17 of the first active region 9 to a second active face 19 of the second active region 11. The transition face 22, which is of rectilinear design. In an alternative embodiment, the transition face 22 can be designed at least partially, in particular concavely and/or convexly, curved. Alternatively, a transition region 21 can be dispensed with, so that the first active region 9 merges into the second active region 11. A transition region 21 and a transition face 22 respectively adjoin the first active face 17 to both sides and respectively delimit the first active face 17 in the peripheral direction u.

The transition face 22 has at least two, in particular mutually opposing, first transition edges 71. The second transition face 22 has at least two, in particular mutually opposing, second transition edges 71.

Preferably, the transition face 22 and/or the transition edges 71 have cutting elements 13 configured as cutting grains 13.

The work zone 7 has a plurality of radial recesses 27. The recesses 27 are designed open in the radial direction, as can be seen in FIGS. 1 and 2. The recess 27 can be divided into two portions 89, 91. A first portion 89 is of channel-shaped design, in particular with a width b of 2.3 mm, and extends in the radial direction, starting from a peripheral region or an active face 17, 19 of the work zone 7, to the axis a of the cutting disk 1. The channel-shaped portion 89 is formed by at least two, in particular radial, side edges 87, which run parallel to one another. The two side edges 87 respectively adjoin adjacent second active faces 19 of the second active region 7. In particular, the side edges 87 merge respectively into second active faces 17, 19. The first portion 89 opens out into a spherical second portion 91 of the recess 27.

A first active region 9, two second active regions 11 and two transition regions 21 are divided into peripheral portions 29, which form a circular sector of the cutting disk 1. In particular, the peripheral portions 29 divide the work zone 7 into a plurality of circular portions, which at least partially delimit one another respectively by radial recesses 27. Preferably, the work zone 7 has two mutually opposing second active regions 11, which are mutually separated by the radial recess 27. Alternatively, the peripheral portion 29 can merely have a first active region 9 and a second active region 11.

In particular, a plurality of successive peripheral portions 29 are provided.

Figure 3:
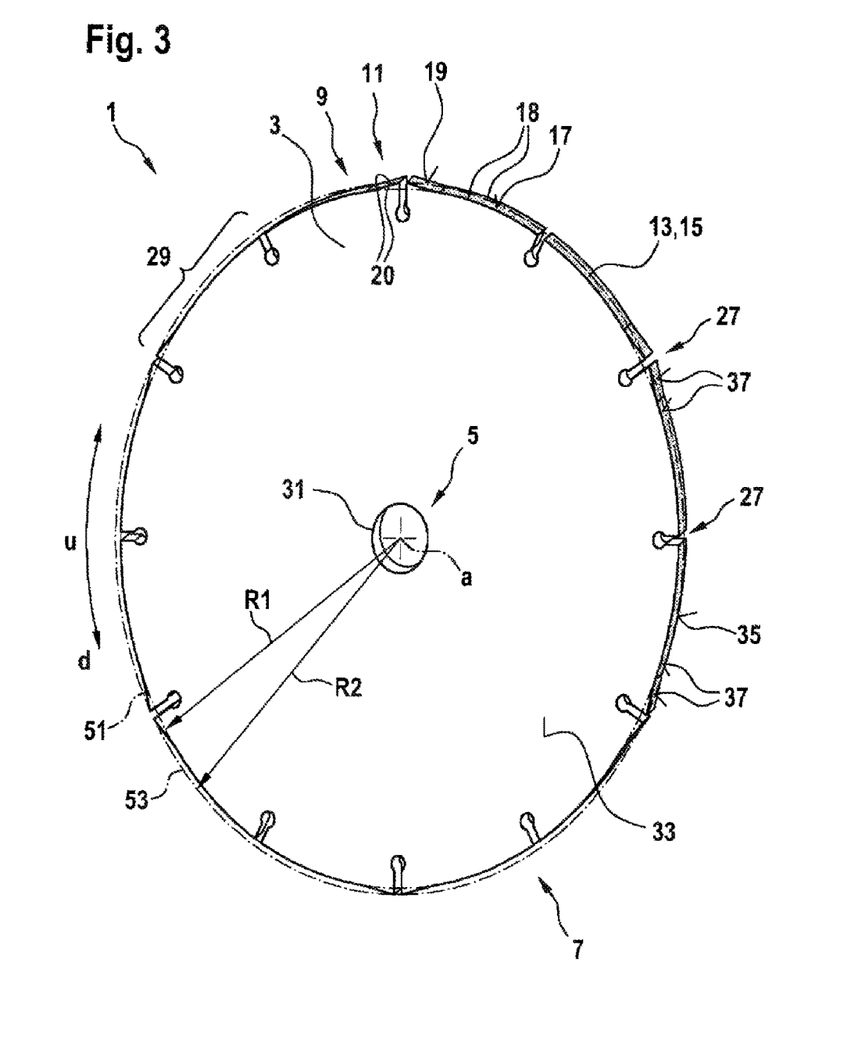
FIG. 3 shows a perspective view of a second embodiment of a cutting disk according to the disclosure.

In FIG. 3, a second embodiment of the cutting disk 1 can be seen from FIGS. 1 and 2. Unlike the first embodiment, the work zone 7 of the cutting disk 1 has no transition region, so that the first active faces 17 merge into the second active faces 19. The second active face 19 rises radially in relation to the first active face 17 continuously in the peripheral direction u. The first active face 17 merges into the second active face 19. Alternatively or additionally, the second active face 19 can rise radially, in the shape of a step, in the peripheral direction u.

The first active region 9, in particular the first active face 17, borders in the peripheral direction u the second active region 11, in particular the second active face 19.

In the peripheral direction u, a recess 27 separates either two first active regions 9 or two second active regions 11. In particular, in the peripheral direction of the work zone 7, a recess 27 separates either two first active faces 17 or two second active faces 19.

Preferably, if two second active regions 11 are separated by means of a recess 27, respectively a second active region 11, which is located upstream of the recess 27 in the rotational direction d, rises, and a second active region 11, which is located downstream of the recess 27 in the rotational direction, falls. Here, both the upstream second active region 11 and the downstream second active region 11 rise radially in the rotational direction d adjacently, in particular contiguously, to the recess 27.

Respectively a first active region 9 and a second active region 11 are divided into peripheral portions 29, which form a circular sector of the cutting disk 1. The peripheral portions 29 are mutually at least partially delimited respectively by radial recesses 27. The peripheral portions 29 respectively have a second active face 19, which rises either in the rotational direction d or counter to the rotational direction d in relation to a first active face 17. Alternatively or additionally, peripheral portions 29 which have two second active regions 11 or two second active faces 19 and a first active region 9 or a first active face 17 can be provided, so that, in particular, a second active region 11 or a second active face 19 is respectively provided adjacent to the recesses 27.

The recesses 27 in the work zone 7 of the second embodiment differ in their radial extent, in that recesses 27 which separate two first active regions 9 or two first active faces 17 have a lesser radial extent than recesses which separate two second active regions 11 or two second active faces 19.

Figure 4:
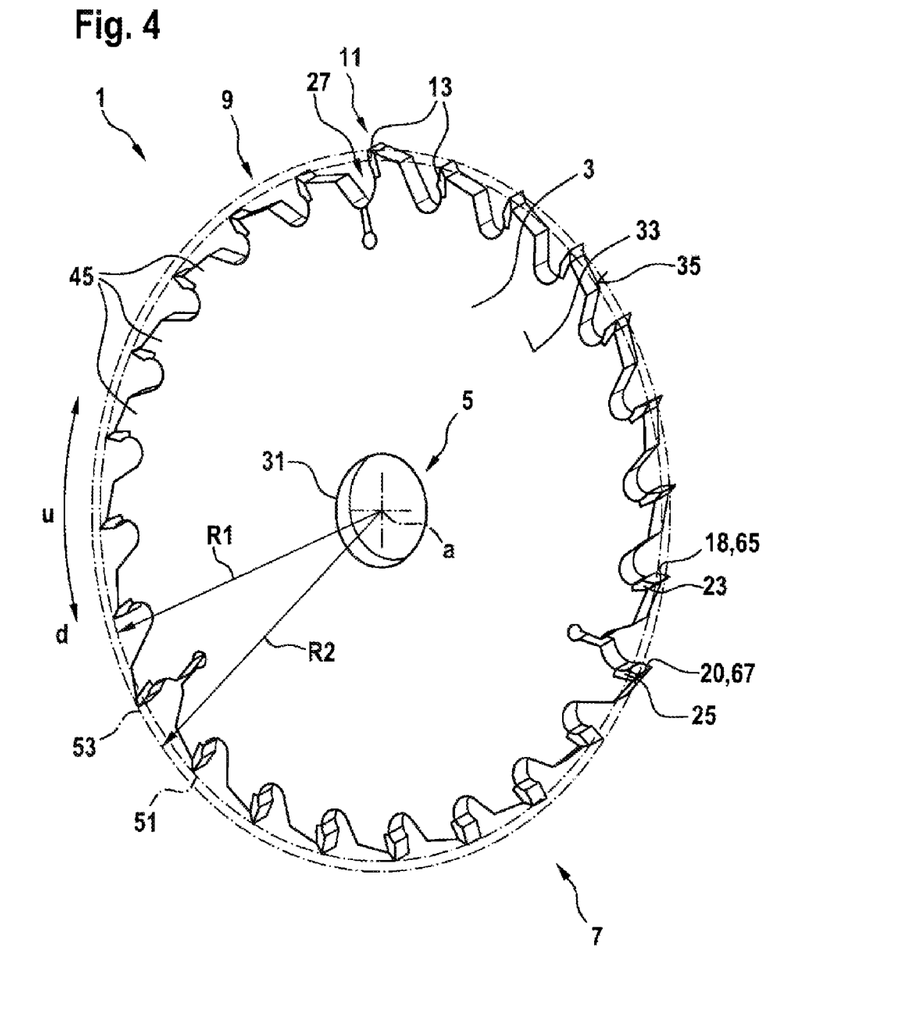
FIG. 4 shows a perspective view of a third embodiment of a cutting disk according to the disclosure.

In FIG. 4 can be seen a third embodiment of the cutting disk 1 from FIG. 1 and FIG. 3. Unlike the first and second embodiment, cutting elements 13 configured as cutting teeth 23, 25 are provided. The cutting teeth 23, 25 project out of the main body 3 in the radial and/or in the axial direction. In this case, the first active region 9 has a plurality of cutting tooth carriers 45, which extend in the radial direction. The cutting tooth carriers 45 here delimit the radial extent of the main body 3. The second active region 11 has a single cutting tooth carrier 45, which extends in the radial direction and delimits the radial extent of the main body 3. The cutting tooth carrier 45 of the second active region 11 protrudes radially in relation to the cutting tooth carriers 45 of the first active region 9.

The cutting teeth 23, 25 are respectively connected, in particular integrally, to radially protruding cutting tooth carriers 45 of the main body 3 of the cutting disk 1. The cutting teeth 23, 25 are spaced apart in the peripheral direction u.

The cutting teeth 23, 25 respectively have at least one geometrically defined active edge 18, 20, which is configured as a cutting edge 65, 67 and which extends, in particular at least partially, in the axial direction. The cutting teeth 23, 25 should here not be confined to a tooth geometry, such as, for instance, inverted V tooth or pointed tooth, but can have any tooth geometry which appears sensible to a person skilled in the art.

The at least one first active edge 65, 18 of the first cutting tooth 23 can form a first envelope 51, and the at least one second active edge 67, 20 of the second cutting tooth 25 can form a second envelope 53, so that the second envelope 53 fully surrounds the first envelope 51 and preferably runs parallel thereto. Preferably, each first active edge 65, 18 of the first active region 9 lies on the first envelope 51. The first envelope 51 has a first radius R1 and the second envelope 53 has a second radius R2, wherein the second radius R2 is larger than the first radius R1. In particular, the second active region 11 or the second cutting tooth 25 is designed such that it protrudes radially in relation to the first active region 9 or at least the first cutting tooth 23.

The first active region 9 has respectively seven first cutting teeth 23. Alternatively or additionally, the first active region 9 can have fewer, such as, for instance, two, three, four, five or six or more, such as, for example, eight, nine, ten, eleven or more, first cutting teeth 23.

The second active region 11 has respectively a single second cutting tooth 25. Alternatively, the second active region 11 can also however have two, three, or more second cutting teeth.

The cutting teeth 23, 25 of the active regions 9, 11 are respectively spaced apart in the peripheral direction u. The active regions 9, 11 too are respectively spaced apart in the peripheral direction u.

What is claimed is:

1. A cutting disk for a machine tool for at least one of cutting and grinding of workpieces, comprising:
    a disk-shaped main body including a radially inside receiving region and a radially outside work zone, the radially outside work zone including at least one first active region, which has at least one first active face extending along a circular segment of the disk-shaped main body, and at least one second active region,
    wherein the at least one first active region has first cutting grains disposed on the at least one first active face, the first cutting grains configured to machine a workpiece, and
    wherein the at least one second active region includes a cutting tooth or second cutting grains, and extends or protrudes outwardly in the radial direction in relation to the at least one first active region.

2. The cutting disk according to claim 1, wherein:
    the first active region has at least one first active edge;
    the second active region has one or more of at least one second active face and at least one second active edge; and
    the at least one first active edge and the one or more of the at least one second active face, and the at least one second active edge are configured to machine the workpiece.

3. The cutting disk according to claim 1, wherein the at least one first active region is arranged offset in a peripheral direction in relation to the at least one second active region.

4. The cutting disk according to claim 1, wherein the at least one second active region at least partially forms a maximum radial extent of the cutting disk.

5. The cutting disk according to claim 2, wherein a radially outer extent of the at least one first active edge forms a first circular envelope centered at a center of the cutting disk, a radially outer extent of the at least one second active edge forms a second circular envelope centered at the center of the cutting disk, and the second envelope fully surrounds the first envelope and runs parallel to the first envelope.

6. The cutting disk according to claim 1, wherein:
    the at least one second active region includes a first end and a second end; and
    a radial extent of the at least one second active region continuously increases in a peripheral direction from the first end to the second end.

7. The cutting disk according to claim 1, further comprising:
    at least one transition region in the radially outside work zone connecting the at least one first active region to the at least one second active region.

8. The cutting disk according to claim 7, wherein:
    a radial extent of the transition region continuously increases in a peripheral direction from the first active region to the second active region.

9. The cutting disk according to claim 1, wherein the at least one second active region includes two second active regions defining a recess interposed between the two second active regions, the two second active regions mutually separated from one another in a peripheral direction by only the recess.

10. The cutting disk according to claim 1, wherein:
    the first active region extends a first distance in a peripheral direction;

the second active region extends a second distance in the peripheral direction; and the second distance is 50% or less of the first distance.

11. The cutting disk according to claim 1, wherein the cutting disk is configured to cut into workpieces formed of cellulose or wood.

12. The cutting disk according to claim 2, wherein the one or more of the at least one first active face and the at least one first active edge is arranged contiguously in a peripheral direction in relation to the one or more of the at least one second active face and the at least one second active edge.

13. The cutting disk according to claim 2, wherein:

the one or more of the at least one second active face and the at least one second active edge include a first end and a second end; and a radial extent of the one or more of the at least one second active face an and the at least one second active edge continuously increases in a peripheral direction from the first end to the second end.

14. The cutting disk according to claim 8, wherein the transition region includes one or more of at least one transition face and at least one transition edge.

15. The cutting disk according to claim 9, wherein the recess extends inwardly in the radial direction.

16. The cutting disk according to claim 10, wherein the second distance is 10% or less of the first distance.

17. A cutting disk for a machine tool for at least one of cutting and grinding of workpieces, comprising:

a disk-shaped main body including a radially inside receiving region and a radially outside work zone, the radially outside work zone including at least one first active region and at least two second active regions, wherein the at least one first active region has a plurality of first cutting teeth, wherein a first one of the at least two second active regions has a second cutting tooth, wherein a second one of the at least two second active regions has a third cutting tooth, wherein the second cutting tooth and the third cutting tooth extend or protrude outwardly in a radial direction farther than each of the plurality of first cutting teeth of the at least one first active region, and wherein the at least one first active region is interposed between the first one of the at least two second active regions and the second one of the at least two second active regions in a peripheral direction.

18. The cutting disk according to claim 17, wherein a radially outer extent of each tooth of the plurality of first cutting teeth forms a first circular envelope centered at a center of the cutting disk, a radially outer extent of each of the at least two second active regions forms a second circular envelope centered at the center of the cutting disk, and the second envelope fully surrounds the first envelope and runs parallel to the first envelope.

* * * * *